United States Patent [19]

Tessler et al.

[11] 3,970,767

[45] July 20, 1976

[54] RETORT STARCHES PRODUCTS PREPARED FROM BLENDS OF STARCH AND HIGH AMYLOSE STARCH COMPONENTS

[75] Inventors: Martin M. Tessler, Edison; Wadym Jarowenko, Plainfield, both of N.J.

[73] Assignee: National Starch and Chemical Corporation, Bridgewater, N.J.

[22] Filed: Nov. 14, 1975

[21] Appl. No.: 631,835

Related U.S. Application Data

[62] Division of Ser. No. 487,013, July 10, 1974.

[52] U.S. Cl................................ 426/579; 426/589; 426/661

[51] Int. Cl.$^2$................... A23L 1/195; A23L 1/187; A23L 1/40

[58] Field of Search ........... 426/578, 579, 661, 589

[56] References Cited
UNITED STATES PATENTS

| | | | |
|---|---|---|---|
| 3,804,828 | 4/1974 | Szymanski et al. | 426/661 |
| 3,899,602 | 8/1975 | Rutenberg et al. | 426/578 |

*Primary Examiner*—Jeanette M. Hunter

[57] ABSTRACT

Retort starches comprising blends in specified proportions of starch and high amylose starch, said starches being hydroxypropylated and inhibited to a specified degree. These retort starches exhibit good thin-thick properties and high end viscosities and are especially suited for use in foods such as gravies and puddings.

4 Claims, No Drawings

RETORT STARCHES PRODUCTS PREPARED FROM BLENDS OF STARCH AND HIGH AMYLOSE STARCH COMPONENTS

This application is a divisional application of our application Ser. No. 487,013 filed July 10, 1974.

BACKGROUND OF THE INVENTION

1. Field of the Invention

This invention relates to inhibited, hydroxypropylated blends of starches which are capable of imparting desirable rapid heat penetration and good texture to food products, particularly to puddings, when the foods are cooked at super atmospheric pressure.

2. Brief Description of the Prior Art

Starch has long been used as a thickener for many types of foods. In recent years as the use of prepared and processed foods has become more prevalent, a demand has arisen for foods having properties specially adapted to the requirements of industrial processing. In response to this demand, specially modified starches, capable of imparting to food products these required special properties, have come into use. A particularly useful type of modified starch for the food industry is one having "thin-thick" properties. Such a starch does not develop appreciable viscosity when cooked in boiling water at normal atmospheric pressure, but does develop appreciable viscosity after cooking under pressure (retorting). Starches having "thin-thick" properties are useful in the canning industry when thickened canned foods are to be prepared. When canned foods containing such a starch as a thickening agent are heated in a bath having a temperature between 240° and 300°F., the heat can penetrate rapidly into the unthickened contents of the can to raise the internal temperature of the contents above 212°F. The contents of the can are thus rapidly sterilized. Upon cooling, the cooked starch must thicken in order for the food product in the final form to possess a desired viscosity and texture.

Starches suitable for use under such retorting conditions have been prepared from both corn and high amylose corn; however, none of the retort starches developed heretofore possessed all the necessary properties required for certain end uses. Specifically, retort starches prepared from inhibited corn starch such as those described in U.S. Pat. Nos. 3,422,088 and 3,804,828 have good heat penetration but have relatively low end viscosities after retort so may be unsuited for use in certain food systems; while the degree of inhibition may be decreased in order to raise the end viscosity, this procedure results in poor heat penetration. Retort starches prepared using high amylose products, particularly high amylose corn starch such as those described in co-pending U.S. patent application Ser. No. 317,413 filed Dec. 21, 1972 now U.S. Pat. No. 3,904,601 have also been found to be unsatisfactory for use in certain food systems. In many food systems containing high amounts of natural fats, e.g. chicken gravy, these high amylose starches form complexes with the fats thus decreasing viscosity to an extent such that it has been found necessary to use larger quantities of starch to effect suitable thickening. In other food systems, e.g. pudding, the high amylose starches have been found to produce good viscosity but the final products are noticeably poor in such textural properties as mouth feel.

There is thus a need in the art for a retort starch which will produce food products having a combination of good heat penetration, high end viscosity after retort, good texture and mouth feel.

It is therefore an object of the present invention to provide novel starch blends having properties useful in retorted canned foods. It is a further object of the invention to provide starch blends which do not develop significant viscosity when cooked at retort temperatures, do not develop significant viscosity when cooled to about 120°F., after retorting but do develop significant viscosity when cooled to room temperature after retorting.

SUMMARY OF THE INVENTION

Starch blends suitable for use in retorted food products have been prepared from a mixture of 15–85% by weight of a starch containing at least 50% amylose with the remainder of the mixture comprising a starch having less than 50% amylose. The novel starch blends for use herein must have hydroxypropyl M.S. values with a specified range and are cross-linked to an extent such that an aqueous dispersion containing 5.0% by weight of the blended starch product has a Brookfield viscosity measured at 180°F. of less than 2,000 cps. after being cooked at 5% starch solids concentration, dry basis, in a pH 6.5 buffered salt solution at 212°F. for 10 minutes, followed by 15 minutes at 250°F. and standing at room temperature until it cools to 180°F., and a Brookfield viscosity measured at 75°F. of greater than 1500 cps. when said cooked starch is allowed to stand at room temperature for 24 hours, said viscosity measured at 75°F. being at least about five times greater than the viscosity at 180°F. The novel modified starch blends thus produced have outstanding high temperature, short time retort properties. In particular, the unique properties of the blends allow heat to rapidly penetrate the contents of the can during retorting and also allow the contents of the can to be cooled rapidly after retorting. Moreover, the resulting food products have been found to have high end viscosities as well as excellent textural properties.

DESCRIPTION OF THE PREFERRED EMBODIMENTS

The high amylose starch component, present in an amount of 15–85% by weight of the total starch blend, must be a granular high amylose starch, that is, it must contain more than 50% amylose. Suitable starches for example, may be obtained from varieties of corn yielding starch with amylose contents greater than 50% by conventional wet milling processes. Also included within the scope of the invention are the conversion products derived from high amylose starches, for example oxidized starches prepared by treatment with oxidants such as sodium hypochlorite, and fluidity or thin boiling starches prepared by enzyme conversion or by mild acid hydrolysis.

The second starch component, which comprises the remainder of the blend, must contain less than 50% amylose and may be derived from any granular starch including wheat starch, rice starch, waxy maize starch, tapioca starch and corn starch, with corn starch preferred.

Both the component starches must be hydroxypropylated and cross-linked (inhibited) to a required degree, so as to produce a blend having the desired properties. This may be done by hydroxypropylating and cross-linking the starches separately before blending or the starches may be blended and the blend then subjected to the hydroxypropylation and cross-linking, with the latter procedure being preferred. Alternatively, the individual starch components can be separately hydroxypropylated or inhibited, the components blended and then the blend subjected to the remaining treatment.

The starch components or the blend must be hydroxypropylated to within a specific range of M.S. values. If the two components are hydroxypropylated separately before blending, the M.S. of the starch which contains less than 50% amylose may be within the range of 0.060–0.30, while that of the high amylose starch must be within the range of 0.10–0.30. If the two components are blended before hydroxypropylation, the M.S. value of the blend must be within the range of 0.10–0.30. By the term M.S. is meant the average number of moles of propylene oxide combined with starch per anhydro-D-glucose unit. This hydroxypropylation may be carried out by well known means such as by the reaction of starch with propylene oxide in an alkaline aqueous medium. Hydroxypropylation of starch is described by E. J. Hjermstad, "Production and Uses of Hydroxyethylstarch", in R. L. Whistler and E. F. Paschall, Eds., *Starch: Chemistry and Technology*, Academic Press, New York, 1967, Vol. II, pp. 423–432.

The starches or blends thereof must also be inhibited by cross-linking to a degree which produces the desired viscosity range. If the starch components are inhibited or cross-linked separately, they should be cross-linked to a degree such that an aqueous dispersion containing 5.0% by weight of the high amylose starch component has a Brookfield viscosity measured at 180°F. of 0–200 cps. after being cooked at 5% starch solids concentration, dry basis, in a pH 6.5 buffered salt solution at 212°F. for 10 minutes, followed by 15 minutes at 250°F. and standing at room temperature until it cools to 180°F., and a Brookfield viscosity measured at 75°F. of 1,000–8,000 when the cooked starch is allowed to stand at room temperature for 24 hours; and the starch component containing less than 50% amylose has a Brookfield viscosity after 250°F. retort at 180°F. of 200–10,000 cps. and at 75°F. of 850–20,000 when similarly measured with the viscosity at 75°F. being greater than that at 180°F. In any event, whether the starch components are separately inhibited or inhibited as a blend, the final viscosity range of an aqueous dispersion of the blend must be within the previously described range.

Inhibition may be carried out by reacting the starch or blend with any conventional inhibiting reagent. Typical inhibiting reagents useful in preparing the modified starches of this invention are acrolein, epichlorohydrin, phosphorus oxychloride, 1,4-dichlorobutene-2, cyanuric chloride, sodium trimetaphosphate, bis(ethylcarbonic)adipic anhydride, linear polymeric adipic anhydride, bis(ethylcarbonic)fumaric anhydride, succinyl guanidine, adipyl guanidine, phosgene, 1,1'-carbonyldiimidazole, the diimidazolide of succinic acid, the diimidazolide of adipic acid, divinyl adipate, mixtures of adipic acid with acetic anhydride, acetaldehyde, mixtures of chlorine with glycine, and the like. The inhibition reaction is entirely conventional and is carried out under conditions appropriate for reacting the chosen cross-linking reagent as is well known to those skilled in the art.

The inhibition reaction may, in general, be carried out either before or after the hydroxypropylation reaction. However, in the case of some inhibiting reagents, especially those producing ester cross-linkages, the alkaline conditions used in the hydroxypropylation will disrupt the cross-links. Hence, if this type of cross-link is desired, the hydroxypropylation must be carried out first.

A preferred inhibiting reagent is epichlorohydrin, which may be reacted with the starch in quantities of at least about 0.007%, preferably at least about 0.01%, by weight of the starch, under alkaline conditions at about 104°F. for a period of about five hours, to produce a degree of inhibition suitable for use in food products to be retorted. The resultant starch product is recovered by filtration and washed free of residual salts with water, and is thereafter dried. Alternatively, the product may be drum dried, or spray dried, or gelatinized and isolated by freeze drying or alcohol precipitation.

In order to have thin-thick properties suitable for use in retorting food products, the novel starch blends of this invention must possess certain well-defined viscosity characteristics. Accordingly, the extent of inhibition must be controlled so that dispersions of the resulting modified starch have a Brookfield viscosity after retorting at 250°F. within the rather narrow limits previously described. The viscosity measurements are made as follows. A suspension is cooked with periodic stirring at a concentration of 5.0%, by weight starch solids, dry basis, in a pH 6.5 buffered salt solution for 10 minutes at a temperature of 212°F. and then for 15 minutes at a temperature of 250°F. The concentration of starch solids is adjusted to 5.0% solids, if necessary, by adding more of the buffered salt solution, and the cooked suspension is then allowed to stand for 24 hours at room temperature. The Brookfield viscosity is measured as the paste cools to 180°F., 120°F., 75°F. and after standing 24 hours at room temperature (viscosity measured at 75°F.). As is well known to one skilled in the art, the viscosity of heavy starch dispersions will decrease if the spindle of the Brookfield viscometer is permitted to turn for a long time before recording the viscosity. The viscosity values described herein were obtained by allowing the spindle to turn three complete revolutions before reading and recording the viscosity.

Hydroxypropylated starch blends which are not inhibited will have undesirable texture after retorting with the products being cohesive or stringy. Inhibiting with small amounts of cross-linking reagent, for example about 0.010% epichlorohydrin, will give the starch thickeners of this invention a desired smooth and short texture. If too much cross-linking reagent is used, for example more than about 0.020% epichlorohydrin, the starch thickeners will be too thin after retorting and thus will not be useful. It is not the amount of cross-linking reagent which is added to the reaction vessel that determines the properties of the final product, but the amount of cross-linking reagent which is reacted with the hydroxypropylated starch blend. The amount of cross-linking reagent necessary to give the starch products of this invention desirable texture and viscosity properties will vary depending on the starch bases used, the total amount of amylose in the starches, the cross-linking reagent used, the reaction efficiency of the cross-linking reagent, the level of hydroxypropyl ether substitution on the starch base, and the necessity for having a final product which falls within a specified range of inhibition as determined by its viscosity characteristics. A further discussion of inhibition of starches may be found in C. H. Hullinger, "Production and Use Of Cross-Linked Starch", in R. D. Whistler and E. F. Paschall, Eds., *Starch: Chemistry and Technology*, Academic Press, New York, 1967, Vol. II, pp. 445-450.

The inhibited starch products of this invention are particularly useful in the food industry where they may be employed as thickeners for pie fillings, sauces, soups, baby foods, etc. They are of particular interest in the canning industry as a result of their unique behavior during retorting of the canned food products. In this application, the starch thickeners should not develop significant viscosity when cooked with foods at atmospheric pressure, but should develop significant viscosity after retort cooking conditions (240°-300°F.). When this type of starch thickener is used, the food product can be heated to retort temperatures much faster than normal because the initial low viscosity will result in much better heat transfer into the can and its contents. The reduced cooking time will lower operating costs and also improve the quality of the product. After the contents of the can are sterilized, the starch should thicken to give the final food product the desired viscosity and texture. The starch thickeners of this invention are very useful for this type of retort process since they are initially in a thin state, thereby enabling the heat utilized for sterilization of the food product to rapidly penetrate the can and its contents. After the contents of the can are sterilized and the can is being cooled, the starch products remain thin until the temperature decreases below about 120°F. This enables the contents of the can to be rapidly cooled after retorting and will result in an additional savings in operating costs and also an improvement in the quality of the product. After cooling to 75°F., and standing at room temperature overnight, the starch products thicken and have desirable viscosity and texture.

The usual pH level of canned foods is about 2.0 to 8.0. Food systems at pH 4.5 or less are not normally retorted because *clostridium botulinum* does not grow at these low pH's and heating above 180°F. is sufficient for sterilization. However, these low pH food systems are sometimes heated to retort temperatures, e.g., 270°F. where the starch thickeners of this invention would be advantageous. For example, many spaghetti sauces have low pH's and would not normally be retorted, but a spaghetti sauce and meatball mixture must be retorted to sterilize the meatballs.

The invention will be further illustrated by the following examples which are not, however, intended to limit its scope.

EXAMPLE I

This example illustrates the preparation of the uniquely modified, hydroxypropylated high amylose starch blend products of this invention.

A total of 1000 parts corn starch and 250 parts high amylose corn starch containing 50%, by weight, amylose was introduced into a reaction vessel containing a solution of 18.75 parts sodium hydroxide and 187.5 parts sodium sulfate in 1500 parts water. Then 93.75 parts propylene oxide was added and the vessel was sealed. The contents were allowed to react for 16 hours at 104°F. while the vessel was continuously tumbled to assure uniform suspension of the starch throughout the mixture. Then 17.5 parts of an aqueous epichlorohydrin solution (1.0% by weight) was added to the vessel.

The epichlorohydrin was allowed to react with the starch for 5 hours at 104°F. while the vessel was again continuously tumbled. The pH of the resultant suspension was adjusted to 6.0 by the addition of 9.5% hydrochloric acid solution and the epichlorohydrin-inhibited starch was recovered by filtration, washed three times with water, and dried.

The above described starch derivative (Sample C) was found to contain 6.1% propylene oxide, dry basis (M.S. of 0.18).

EXAMPLE II

This example illustrates the necessity of employing a hydroxypropyl high amylose starch blend having a M.S. within the prescribed range as well as the proper amount of inhibition to obtain good thin-thick properties.

A series of inhibited, hydroxypropylated starch blends were prepared in a manner similar to that employed in Example I, except that the starches and the amounts of propylene oxide and epichlorohydrin were varied. The propylene oxide content and level of inhibition data are summarized in Table I.

The thin-thick properties of the above described inhibited, hydroxypropylated starches were determined in the following manner. A total of 7.5 grams, dry basis, starch was suspended in 130.0 grams pH 6.5 buffer solution and 1.5 grams sodium chloride was then dissolved in the solution. The total weight of the suspension was brought to 150.0 grams by adding additional pH 6.5 buffer solution. The resulting suspensions were cooked for 10 minutes at 212°F. in a water bath followed by 15 minutes at 15 p.s.i.g. and 250°F. in an autoclave. It required about 20 minutes for the autoclave temperature to reach 250°F. and the starch was then heated at 250°F. for an additional 15 minutes. The samples were brought back to 5.0% starch solids with pH 6.5 buffer and the Brookfield viscosities of the 5% pastes were measured as the pastes cooled to 180°F., 120°F., 75°F., and after standing overnight at room temperature (viscosity measured at 75°F.). The pH 6.5 buffer was prepared by dissolving 10,000 grams anhydrous disodium phosphate and 2.000 grams sodium benzoate in approximately 975 ml distilled water. The pH of the resulting solution was adjusted to 6.5 by adding citric acid (approximately 3.5 g. required) and then the total weight was brought to 1,000 grams by adding distilled water.

Table I

| Sample | High Amylose Corn Starch Component | | Other Starch Component | | % Epichlorohydrin based on Starch | % Propylene oxide Content | M.S. |
|---|---|---|---|---|---|---|---|
| | % Amylose | % in Blend | Starch | % in Blend | | | |
| A | 50 | 20 | corn | 80 | 0.020 | 6.1 | 0.18 |
| B | 50 | 20 | corn | 80 | 0.018 | 6.1 | 0.18 |
| C | 50 | 20 | corn | 80 | 0.014 | 6.1 | 0.18 |
| D | 50 | 20 | corn | 80 | 0.016 | 5.6 | 0.17 |
| E | 50 | 20 | corn | 80 | 0.010 | 5.9 | 0.18 |
| F | 50 | 20 | corn | 80 | 0.015 | 5.9 | 0.18 |
| G | 50 | 20 | corn | 80 | 0.007 | 5.9 | 0.18 |
| H | 50 | 33.3 | corn | 66.7 | 0.014 | 5.5 | 0.16 |
| J | 70 | 50 | corn | 50 | 0.010 | 5.8 | 0.17 |
| K | 50 | 50 | corn | 50 | 0.010 | 5.6 | 0.17 |
| L | 50 | 80 | corn | 20 | 0.012 | 6.2 | 0.18 |
| M | 50 | 80 | corn | 20 | 0.008 | 6.2 | 0.18 |
| N | 50 | 50 | waxy maize | 50 | 0.010 | 5.9 | 0.18 |
| O | 50 | 20 | corn | 80 | 0.022 | 5.0 | 0.15 |

Viscosities were measured with a Brookfield RVF viscometer, and the viscosity data are summarized in Table II. All viscosity measurements were obtained by allowing the spindle to turn three complete revolutions before reading and recording the viscosity. Viscosities were measured with spindle No. 2 at speed 10 rpm at 180° and 120°F., and with spindle No. 4 at speed 10 rpm at 75°F.

The data show that when hydroxypropylated, inhibited high amylose corn starch blends are retorted at 250°F. and cooled, the starch dispersions remain relatively thin at 180°F., but develop significant viscosity upon cooling to room temperature. The data also shows that sample O which is overinhibited is unsuitable because its initial low viscosity remains low even after retorting and upon standing overnight, much of the starch settles out thus indicating the criticality of the specified degree of inhibition.

Table II

| Sample | Brookfield Viscosity After 250°F. Autoclaving, cps. | | | |
|---|---|---|---|---|
| | 180°F. | 120°F. | 75°F. | Overnight (75°F.) |
| A | 140 | 420 | 1100 | 1600 |
| B | 140 | 700 | 1500 | 1960 |
| C | 300 | 760 | 2000 | 2800 |
| D | 320 | 940 | 2400 | 3400 |
| E | 1100 | 2920 | 8500 | 11,000 |
| F | 932 | 2468 | 8300 | 13,500 |
| G | 1700 | 2860 | 9100 | 15,000 |
| H | 208 | 532 | 1600 | 3500 |
| J | 44 | 252 | 900 | 4700 |
| K | 400 | 1160 | 3800 | 8300 |
| L | 104 | 560 | 5300 | 6120 |
| M | 188 | 1000 | 5060 | 12,000 |
| N | 1208 | 2312 | 6280 | 6660 |
| O | 58 | 200 | 620 | 400* |

*Starch settled out on standing overnight.

EXAMPLE III

This example illustrates the use of the inhibited, hydroxypropylated blends of this invention in a typical pudding formulation.

The composition of the pudding (pudding X) comprised the following:

| Ingredient | Concentration in parts |
|---|---|
| Starch X | 25.0 anhydrous |
| Sugar | 55.5 |
| Milk substitute based on corn syrup solids, vegetable fat, and vegetable protein | 125.0 |
| Sodium stearyl-2-lactylate | 0.8 |
| Water | remainder |
| | 500.0 Total |

A second pudding was prepared (pudding Y) which had the same composition as pudding X except Starch X was replaced with Starch Y.

Starch X is a blend of 4 parts corn starch and one part high amylose corn starch containing about 50%, by weight, amylose which was treated with 7.5% propylene oxide and 0.016% epichlorohydrin as described in Example I. Starch Y is a blend of 4 parts corn starch and one part high amylose corn starch containing about 70%, by weight, amylose which was treated with 7.5% propylene oxide and 0.016% epichlorohydrin as described in Example I.

Each pudding was evaluated in a high pressure Brabender apparatus. This apparatus consists of a Brabender amylograph which is completely enclosed in a metal chamber. The chamber is sealed and the Brabender viscosity of the pudding composition can be measured at retort temperatures and pressures. The pudding was added to the Brabender amylograph at room temperature (about 75°F.) and then rapidly heated to 270°F. It required about 20 minutes for the temperature to reach 270°F. and the pudding was then rapidly cooled. The viscosity was measured using a 350 cm. g. sensitivity cartridge and the results are shown in Table III. The results show that puddings prepared with the blended starch derivatives of this invention (pudding X and pudding Y) have a very low viscosity during retorting, but develop a relativey high viscosity upon cooling after retorting. Additionally, when identical puddings were subjected to taste testing after being retorted in sealed cans, both of the puddings were found to possess excellent "mouth feel" properties.

TABLE III

| | Viscosities represented in Brabender Units (BU) | |
|---|---|---|
| Time (min.) | Viscosity of A (BU) | Viscosity of B (BU) |
| 0 | 15 | 15 |
| 7.4 | 15 | 15 |
| 10 | 120 | 96 |
| 12.5 | 186 | 255 |
| 15 | 204 | 234 |
| 17.5 | 180 | 195 |
| 20 | 180 | 180 |
| 22.5 | 234 | 195 |
| 25 | 270 | 240 |
| 30 | 380 | 300 |
| 32.5 | 440 | 350 |
| 35 | 525 | 440 |
| 37 | 642 | 588 |
| 40 | 762 | 816 |
| 43 | 816 | 948 |
| 45 | 882 | 1035 |

EXAMPLE IV

This example illustrates the use of various starch inhibiting reagents to prepare the inhibited, hydroxypropylated high amylose starch blends of this invention.

A mixture of 1 part corn starch and 1 part high amylose corn starch containing 50%, by weight, amylose was treated with 7.0% propylene oxide as described in Example I. The resulting starch (Starch Q) contained 5.6% propylene oxide (M.S. = 0.17).

Starch R — a total of 250 parts Starch Q was suspended in 320 parts water containing 75 parts sodium sulfate and 3.75 parts sodium hydroxide. Then 0.025 parts phosphorus oxychloride was added and the mixture reacted with agitation at 104°F. for two hours. The pH of the resultant suspension was lowered to 6.0 by the addition of 10% hydrochloric acid solution and the starch recovered by filtration, washed three times with water, and dried.

Starch S — a total of 250 parts Starch Q was suspended in 320 parts water containing 75 parts sodium sulfate and 3.75 parts sodium hydroxide. Then 0.05 parts sodium trimetaphosphate was added and the mixture reacted with agitation at 104°F. for 4 hours. The pH was then lowered to 6.0 by the addition of 10% hydrochloric acid and the starch recovered by filtration, washed three times with water, and dried.

Starch T — a total of 250 parts Starch Q was suspended in 320 parts water containing 75 parts sodium sulfate and 3.75 parts sodium hydroxide. Then 0.05 parts acrolein was added and the mixture reacted with agitation at 104°F. for 4 hours. The pH was lowered to 6.0 by the addition of 10% hydrochloric acid and the starch recovered by filtration, washed three times with water, and dried.

The starches described above were evaluated by the procedure described in Example II and the retort data are summarized below.

| | Brookfield Viscosity After 250°F. Autoclaving | | | |
|---|---|---|---|---|
| | 180°F. | 120°F. | 75°F. | Overnight |
| Starch R | 732 | 1,700 | 5,740 | 11,400 |
| Starch S | 556 | 2,064 | 6,380 | 10,580 |
| Starch T | 952 | 2,604 | 8,260 | 12,160 |

EXAMPLE V

This example illustrates the use of the inhibited, hydroxypropylated high amylose starch blends of this invention in a typical condensed cream of mushroom formulation.

A Cenco-Bostwick consistometer was used to measure viscosity. Bostwick viscosity is measured in terms of the distance a sample flows on an inclined plane in 60 seconds. The greater the distance traveled, the lower the viscosity.

The composition of the condensed cream of mushroom soup comprised the following:

| Ingredient | Concentration in Parts |
|---|---|
| A. milk | 105.00 |
| water | 62.07 |
| heavy cream | 24.00 |
| sugar | 2.82 |
| B. Starch S (Example IV) | 13.50 |
| water (total of water adsorbed by starch and free water) | 90.00 |
| mushrooms | 30.00 |
| vegetable oil | 9.00 |
| salt (sodium chloride) | 5.40 |
| monosodium glutamate | 0.09 |
| white pepper | 0.09 |
| curry powder | 0.03 |

Part A was heated to 190°–195°F. and Part B was then added. The resulting mixture was heated for about 10 minutes at 180°F. with agitation. The mixture had an initial Bostwick viscosity (distance flowed in 60 seconds), measured at 180°F., of 17 cm. The hot mixture was placed in an autoclave and heated to 258°F. at 19 p.s.i.g. It required about 20 minutes for the autoclave temperature to reach 258°F. and the soup was retorted at 258°F. for an additional 30 minutes. The Bostwick viscosity immediately after retort (measured at 180°F.) was 11 cm. After being stored at room temperature for 24 hours, the Bostwick viscosity (measured at 75°F.) was 7 cm.

This data shows that the starch thickeners of this invention remain thin when cooked at 180°F., remain relatively thin during retorting, but develop viscosity after retorting.

EXAMPLE VI

This example illustrates the preparation of a chicken gravy containing a typically inhibited high amylose starch blend of the present invention and the viscosity characteristics thereof.

A total of 181.8 parts of chicken broth (fat removed, 9.6 parts of vegetable oil, 180.6 parts of water, and 25.5 parts of Starch S as described in Example IV, were combined and cooked at 190°F. for a period of 30 minutes. Water lost by evaporation was replaced in order to keep a constant weight. The Bostwick viscosity of the chicken gravy, measured at 180°F. was 20.4 cm. in 60 seconds. The chicken gravy was then placed in an autoclave and heated to 258°F. at 19 p.s.i.g. It required about 20 minutes for the autoclave temperature to reach 258°F. and the chicken gravy was retorted at 258°F. for an additional 30 minutes. The Bostwick viscosity immediately after retort (measured at 180°F.) was 23.6 cm. in 60 seconds. After being stored at room temperature for 24 hours, the Bostwick viscosity (measured at 75°F.) was 11.4 cm. in 60 seconds.

This data shows that the starch thickeners of this invention remain thin when cooked at 190°F., remain thin during retorting, but develop significant viscosity after retorting.

EXAMPLE VII

This example illustrates the preparation of the novel starch blends of the present invention by separately inhibiting and hydroxypropylating the individual starch components and then combining them to produce a blend having the desired properties.

The individual starches were treated as in Examples I or IV varying the starches, the inhibiting agents and the amounts of reagents. The results are shown in Table IV.

The hydroxypropylated and inhibited starches were then blended in varying proportions and the viscosities measured using the procedure of Example II. The results are shown in Table V.

The data readily shows that when the starch components are individually hydroxypropylated and inhibited prior to blending, the blended starch dispersions possess superior viscosity characteristics.

TABLE IV

| | | Inhibiting Agent | | % Propylene Oxide Content | |
|---|---|---|---|---|---|
| Sample | Base Starch | % POCl₃ | % Epichlorohydrin | | M.S. |
| AA | High amylose corn (50% amylose) | | 0.015 | 8.0 | 0.24 |
| BB | High amylose corn (50% amylose) | | 0.009 | 6.5 | 0.19 |
| CC | Corn | 0.022 | | 5.0 | 0.15 |
| DD | Corn | 0.012 | | 3.3 | 0.10 |
| EE | Waxy Maize | 0.030 | | 4.7 | 0.14 |
| FF | Waxy Maize | 0.020 | | 5.5 | 0.16 |

| | Brookfield Viscosity After 250°F. Autoclaving, cps. | | | |
|---|---|---|---|---|
| Sample | 180°F. | 120°F. | 75°F. | Overnight (75°F.) |
| AA | 12 | 52 | 260 | 1148 |
| BB | 28 | 140 | 2100 | 7480 |
| CC | 200 | 340 | 700 | 880 |
| DD | 2800 | 3520 | 5800 | 6480 |
| EE | 3940 | 6340 | 10400 | 11200 |
| FF | 6660 | 10060 | 14200 | 15140 |

TABLE V

| Blend Composition | Brookfield Viscosity after 250°F. Autoclaving | | | |
|---|---|---|---|---|
| | 180°F. | 120°F. | 75°F. | Overnight (75°F.) |
| BB:CC (4:1) | 44 | 156 | 1400 | 5400 |
| BB:DD (4:1) | 56 | 168 | 1480 | 5440 |
| BB:EE (4:1) | 52 | 164 | 2180 | 6280 |
| BB:FF (4:1) | 60 | 176 | 620 | 4420 |
| BB:DD (1:4) | 620 | 1380 | 2260 | 2980 |
| BB:EE (1:4) | 700 | 2540 | 3900 | 4840 |
| AA:DD (4:1) | 36 | 132 | 448 | 2460 |

EXAMPLE VIII

This example illustrates the use of the inhibited, hydroxypropylated starch blends of this invention in a typical pudding formulation where both components of the starch blend are inhibited and hydroxypropylated separately and subsequently combined.

High amylose corn starch containing 55% by weight amylose was treated with 10.0% propylene oxide followed by 0.015% epichlorohydrin as described in Example I. Zeisel analysis of the resulting starch product (Starch V) indicated it contained 8.0% propylene oxide, dry basis (M.S. of 0.24).

Corn starch was treated with 7.0% propylene oxide followed by 0.022% phosphorus oxychloride as described in Example IV. Zeisel analysis of the resulting starch product (Starch W) indicated it contained 4.6% propylene oxide, dry basis (M.S. of 0.13).

Puddings A and B were prepared as in Example III except Starch X was replaced with Starch Blend A, and Starch Y replaced with Starch Blend B.

Starch Blend A was prepared by blending one part Starch V and one part Starch W. Starch Blend B was similarly prepared with four parts Starch V and one part Starch W.

Each pudding was heated to 180°F. and then sealed in a can. The cans were then placed in a Berlin Chapman laboratory model rotary retort apparatus and retorted at 248°F. The temperatures inside the cans were continuously recorded and the rate of temperature increase is a direct measure of heat penetration into the can. The data is shown in Table VI, and indicates very rapid heat penetration occurs since the inside can temperature reaches 240°F. in about 15 minutes. After retorting, the cans were cooled and stored at room temperature for 24 hours and the viscosity measured with a Cenco-Bostwick consistometer. The Bostwick viscosity of Pudding A was 8.5 cm. (measured at 78°F.) and Pudding B was 4.6 cm.

TABLE VI

| Time (min.) | Inside Can Temp. of A (°F.) | Inside Can Temp. of B (°F) |
| --- | --- | --- |
| 0 | 168 | 162 |
| 2 | 163 | 163 |
| 2.5 | 164 | 164 |
| 5 | 175 | 184 |
| 7.5 | 209 | 212 |
| 10 | 224 | 226 |
| 15 | 238 | 240 |
| 20 | 244 | 245 |
| 24 | 245 | 246 |

In summary, this invention discloses novel starch blends exhibiting excellent properties for use in retorted food products prepared by hydroxypropylation and inhibition of a mixture of a starch component containing less than 50% amylose and a starch component containing at least 50% amylose. These novel blends, when used in such foods as puddings and gravies, give both desirable viscosity as well as excellent mouth feel in the final product.

Variations may be made in procedures, proportions and materials without departing from the scope or spirit of the invention.

We claim:

1. A food product adapted for retorting containing as a thickener a cross-linked, hydroxypropylated starch product comprising:
   a. 15–85% by weight, of a starch containing at least 50% amylose; and
   b. the remainder of the product comprising a starch containing less than 50% amylose;

said product being hydroxypropylated and cross-linked to an extent such that an aqueous dispersion containing 5.0% of said starch product has a Brookfield viscosity measured at 180°F. of less than 2,000 cps. after being cooked at 5.0% starch solids concentration dry basis, in a pH 6.5 buffered salt solution at 212°F. for 10 minutes, followed by 15 minutes at 250°F. and standing at room temperature until it cools to 180°F.; and a Brookfield viscosity measured at 75°F. of greater than 1,500 cps. when said cooked starch is allowed to stand at room temperature for 24 hours; said viscosity measured at 75°F. being at least about five times greater than the viscosity at 180°F.; the degree of hydroxypropylation being such that when the two starch components are blended together prior to being hydroxypropylated, the resulting blend is hydroxypropylated to an M.S. of 0.10–0.30 and when the two starch components are separately hydroxypropylated prior to blending, the starch component containing at least 50% amylose has a hydroxypropyl M.S. of 0.10–0.30 and the starch containing less than 50% amylose has a hydroxypropyl M.S. of 0.06–0.30.

2. The food product of claim 1 wherein the product is a pudding.

3. The food product of claim 1 wherein the product is a chicken gravy.

4. A food product adapted for retorting containing as a thickener a cross-linked, hydroxypropylated starch product comprising:
   a. 15–85% by weight, of a starch containing at least 50% amylose, said starch being hydroxypropylated and cross-linked to an extent such that an aqueous dispersion containing 5.0% of said starch has a Brookfield viscosity measured at 180°F. of 0–200 after being cooked at 5.0% starch solids concentration, dry basis, in a pH 6.5 buffered salt solution at 212°F. for 10 minutes, followed by 15 minutes at 250°F. and standing at room temperature until it cools to 180°F., and a Brookfield viscosity measured at 75°F. of 1,000–8,000 cps. when the cooked starch is allowed to stand at room temperature for 24 hours; and
   b. the remainder of the product comprising a starch containing less than 50% amylose, said starch being hydroxypropylated and cross-linked to an extent such that an aqueous dispersion containing 5.0% of said starch has a Brookfield viscosity measured at 180°F. of 200–10,000 cps. after being cooked at 5.0% starch solids concentration, dry basis, in a pH 6.5 buffered salt solution at 212°F. for 10 minutes, followed by 15 minutes at 250°F. and standing at room temperature until it cools to 180°F., and a Brookfield viscosity measured at 75°F. of 850–20,000 when the cooked starch is allowed to stand at room temperature for 24 hours, with the viscosity at 75°F. being greater than that at 180°F; the degree of hydroxypropylation being such that the starch component containing at least 50% amylose has a hydroxypropyl M.S. of 0.10–0.30 and the starch containing less than 50% amylose has a hydroxypropyl M.S. of 0.06–0.30.

* * * * *